(No Model.)
J. BLIZZARD.
DRESS CHART.
No. 479,548. Patented July 26, 1892.
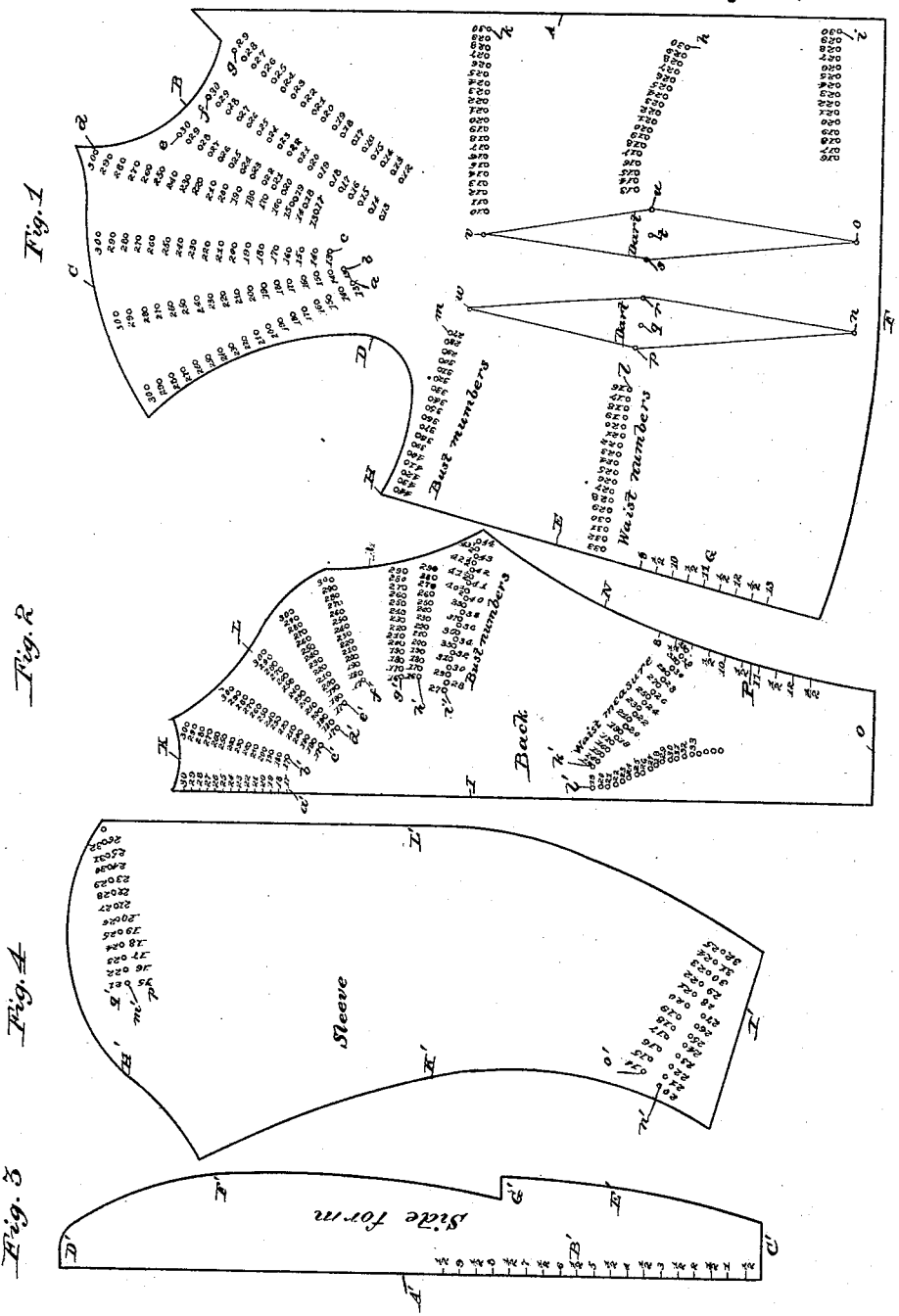
Witnesses;
J. P. Coleman
M. C. Massie
Inventor
Jennie Blizzard
By Wm Hunter Myers
Att'y

UNITED STATES PATENT OFFICE.

JENNIE BLIZZARD, OF FORT RECOVERY, OHIO.

DRESS-CHART.

SPECIFICATION forming part of Letters Patent No. 479,548, dated July 26, 1892.

Application filed March 16, 1892. Serial No. 425,112. (No model.)

*To all whom it may concern:*

Be it known that I, JENNIE BLIZZARD, a citizen of the United States of America, residing at Fort Recovery, in the county of Mercer and State of Ohio, have invented certain new and useful Improvements in Dress-Charts, of which the following is a specification, reference being had therein to the accompanying drawings.

My invention relates to dress-charts; and it has for its object the production of a chart which can be utilized for laying out garments of various sizes.

The invention will first be described in connection with the accompanying drawings, and then pointed out in the claim.

Referring to the drawings, Figure 1 represents the front section of the dress-chart; Fig. 2, the back section; Fig. 3, the side form-section; Fig. 4, the sleeve-section.

In Fig. 1, A is the front line; B, the neck; C, the shoulder; D, the armhole; E, the side, and F the bottom. At established intervals are rows of numbers $a$, $b$, $c$, $d$, $e$, $f$, $g$, $h$, and $i$, which for convenience of reference are called "first-measurement" numbers. There are also two rows of numbers $k$ and $l$, called "waist" numbers, and one row $m$, called "bust" numbers. Each of these numbers has a perforation contiguous thereto. Besides these rows are the isolated perforations $n$, $o$, $p$, $q$, $r$, $s$, $t$, $u$, $v$, and $w$ for laying off the darts. On the side edge E is a scale G, graduated by inches and half-inches from "9" to "13," the zero or starting point of said scale being the corner H between the armhole D and the side E. Each of the numbers in rows classed as "first-measurement," "waist," and "bust" numbers, respectively, is equal to the number of inches in the respective measurements for which it is used and indicates a perforation appropriate to be used in laying out the outline of a garment suitable to such measurement. The dart-holes, being common to all sizes, and therefore the same for all measurements, are not numbered. The edges of the chart-sections are to be used for giving the proper shape to the pattern to be laid out.

In Fig. 2, I is the middle or central line of the back. K is the neck; L, the shoulder; M, the armhole; N, the side, and O the bottom. $a'$, $b'$, $c'$, $d'$, $e'$, $f'$, $g'$, and $h'$ are rows of figures indicating first-measurement numbers, opposite each row, excepting $a'$, being a row of perforations. $i'$ is a row called "bust" numbers, and $k'$ and $l'$ are rows of waist numbers. Each of the perforations is indicated by a number which is equal to the number of inches in the measurement for which it is used. P is a scale located on the side edge N, graduated from "8" to "$12\frac{1}{2}$" and indicating inches and half-inches, the zero of said scale being the axis of the row of perforations $g'$. The measurement indicated by each graduation is the vertical distance of itself in inches from the said row of perforations $g'$.

In Fig. 3, A' is a straight edge, with a scale B'. C' is the top, and D' the bottom. The remaining edge has two curves E' and F' and the connecting edge G'. The scale B' indicates inches, and its zero is the top edge C'. These various straight and curved edges are used for ruling outlines of the side pieces and darts, as will be more fully described hereinafter.

In Fig. 4, H' is the top of sleeve, and I' the bottom. K' is the inner edge, and L' the outer one. $m'$ is a row of perforations near the top of the sleeve. This row of perforations is accompanied by two sets of indicating numbers or figures $p'$ and $q'$. $n'$ and $o'$ are two rows of perforations at the lower end of sleeve. The row of figures $q'$ at the upper end of the sleeve, used in connection with the row of perforations $m'$, and the lower row of perforations $n'$ with its numbers are used for the purpose of laying out the under-sleeve pattern, while the inner row of numbers at the upper end of the sleeve, used in connection with the same row of perforations $m'$, and the row of perforations $o'$ and its accompanying numbers are used in laying off the pattern of the upper sleeve. The numbers used in connection with the perforations indicate the number of inches in the first measurement taken.

In the use of this chart the measurements of the person for whom the garment is to be made are taken as follows: from the neck-joint up over the shoulder, around under the arm, and back to place of beginning. The result in inches is called the "first measurement" and corresponds with the numbers on the chart heretofore described as "first-measurement" numbers. Measure around the waist.

The result in inches corresponds to the numbers on chart known as "waist" numbers. Take the measure of bust close under the arms and over the largest part of bust. The result in inches corresponds to numbers on chart known as "bust" numbers. Measure from the neck-joint down the center of back to the waist. This gives length of waist. Measure in the front from the neck to the waist for front measure. Measure along the side from close under the arm to the hip. This is the first under-arm measure. Measure from the lowest back part of arm down to the waist at center of back. This is the second under-arm measure.

For the purpose of more clearly describing the use of this chart I will assume that I have obtained the following measurements: first measure, twenty-three inches; waist, twenty-six; bust, forty-two; length of waist, nineteen; front, fifteen and one-half; first under-arm, nine and one-half; second under-arm, eleven and one-half.

The use with any set of measurements being similar, I will describe the operation of using the chart in connection with the above measurements.

First, place the front section on the cloth, and then, as the first measurement is twenty-three inches, find the perforations numbered "23" in all the rows which I have heretofore classed as "first-measurement" numbers and which are indicated on the drawings as $a$, $b$, $c$, $d$, $e$, $f$, $g$, $h$, and $i$, Fig. 1. Dot through these perforations on to the cloth with some suitable pencil or chalk, in order to mark the position of said perforations on it. As the waist measure is twenty-six inches find the perforations numbered "26" in the rows designated "waist" numbers and shown in Fig. 1 as $k$ and $l$; dot through as before onto the cloth. The bust measure being forty-two inches, find perforation 42, in row of bust-numbers, (shown as $m$, Fig. 1;) dot through to cloth. For the sake of brevity these dots and any others made hereinafter will be referred to by the number and row of the perforations in the chart by which they were made, as dot 23, row $a$; dot 26, row $l$, &c. Dot through the ten perforations heretofore described as dart-perforations or dart-holes, and shown on drawings as $n$, $o$, $p$, $q$, $r$, $s$, $t$, $u$, $v$, and $w$, Fig. 1. Next slide the front section so that the side edge E will be in position to draw a line from dot 42, row $m$, through and beyond dot 26, row $l$. Having the corner H on the aforesaid dot 42, row $m$, draw a line on the cloth, using edge E as a guide, and lay off the length or number of inches of the second under-arm measure, (in this case eleven and one-half,) using the scale G for this purpose. Using the edge of the curved armhole D as a guide draw the curved armhole onto the cloth, this curve connecting dot 42, row $m$, and dot 23, row $a$. Using the edge of shoulder C as a guide draw a line through dots 23, rows $a$, $b$, $c$, and $d$. Using edge of neck B as a guide draw a line through dots 23, rows $d$, $e$, $f$, and $g$. With straight front edge A of chart as a guide draw straight lines connecting dot 23, row $g$, with dot 26, row $k$; dot 26, row $k$, with dot 23, row $h$; dot 23, row $h$, with dot 23, row $i$. With dot 23, row $g$, as a center and with a radius equal to the fifth measurement, (front measure,) which in this case is fifteen and one-half inches, strike an arc, cutting the last line drawn, which is from dot 23, row $h$, to dot 23, row $i$. Connect the intersection of the arc and said line with dot 26, row $k$; also, connect said intersection with the end of the second under-arm measurement (heretofore laid off by the side E and scale G) by a straight line. This last line is the waist-line. At the intersection of the waist-line and the side line drop a perpendicular to the waist-line, making said perpendicular four inches long, and at the lower end of same draw a line outwardly at a right angle with the perpendicular and parallel to the waist-line and two inches long. Connect the outer end of this last line with the intersection of waist-line and side line. This gives the slope over hips. The before-mentioned four inches and two inches are invariable for all sizes. Allow enough cloth for seams at side edge E and shoulder C.

To draw darts, use side form-section, Fig. 3. Place the apex of the re-entrant angle formed by the intersection of edges G' and F' on the waist-line, having curved edge F' passing through dots $u$ and $v$. With said curved edge as a guide draw a line on cloth passing through said dots down to and intersecting the waist-line. Draw a straight line through and connecting dots $v$ and $s$ and extending down to and intersecting waist-line. From dot $t$ to and through dot $o$ draw a straight line extending seven inches below waist-line. Connect the lower end of the last line by a straight line with the intersection of the curved line through dots $v$ and $u$ and the waist-line; also, connect the lower end of the line $t$ $o$ with the intersection of the straight line $v$ $s$ and the waist-line. The second dart is laid out in a similar manner, using dots $w$, $p$, $q$, $r$, and $n$. The seven inches (length of dart below waist-line) is invariable for all sizes. The bottom line of garment is drawn by using the lower edge of front section F, Fig. 1, as a guide, said bottom line being placed, as desired, at any point below the lower end of darts. The front edge of pattern and the side edge or hip-extension of same are projected downward in the direction of their length until they meet the bottom line. Between the two darts just located and described and the side edge E of the garment another dart is drawn, as follows: Bisect the portion of waist-line between the side edge E and nearest edge of inner or second dart as laid down on cloth. From said point of bisection draw a straight line to the armhole curve, approximately at its lowest point. On this line, measuring down from the armhole curve, lay off the first under-arm measure, (in this case nine and a half inches,) using for this purpose the scale on side-form section, as shown by B', Fig. 3. At the lower end of said measurement draw at right angles to said straight line a line extending one and one-half inches each way. (This measurement is the same in all cases.) From the two ends of this last line draw lines to the armhole, converging until at intersection with armhole they are only one-half inch apart. (This measurement is the same in all cases.) From the intersection of the center straight line first drawn with the base line or line at right angle to said center line, (being in this case nine and a half inches from the armhole,) and drop a line eight inches long and perpendicular to the waist-line and crossing same. Connect the heretofore-mentioned two ends of the base-line (or line drawn at right angle to center straight line) with the end of this last eight-inch line. This completes the outline or pattern for one side of the garment-front.

To lay off the back of garment, use back section, Fig. 2. Place it on the cloth, rule an indefinite straight line, using the edge I as a guide. Without moving it make a dot at the graduation in row $a'$ corresponding to the number of inches in first measurement, (in this case 23,) and then mark through perforations bearing same number in rows $b'$, $c'$, $d'$, $e'$, $f'$, and $g'$; also, dot through perforations having number equal to the number of inches in waist-measure (in this case 26) in row of waist numbers $l'$. Connect dot 23, row $a'$, with dot 23, row $b'$, by using edge of back section at neck K as a guide. With shoulder edge L as a guide draw a line through dots 23, rows $b'$, $c'$, $d'$, $e'$, and $f'$. Then connect dots 23, rows $f'$ and $g'$, by a line, using edge M as a guide. On the straight line I, commencing at the point or dot 23, row $a'$, lay off the length of waist or fourth measurement, which in this case is nineteen inches. From the end of this measurement draw a line at right angle to said straight line, so that it will meet and end at a line dropped from dot 26, row $l'$, parallel with said first straight line. With the curved edge F' of the side form section, Fig. 3, as a guide and having the apex of the re-entrant angle (formed by the intersection of its side G' and curved side F') on the above-mentioned intersection of line from dot 26, row $l'$, and right-angle line draw an inwardly-curved line from said intersection to dot 23, row $g'$. Extend the lower part of back-pattern as much below the aforesaid right-angle line as may be desired and flare it to suit the fashion of the garment to be cut. This part is discretionary and not determined by the chart. Allow for seams on back, central, or middle line, edge I, Fig. 2, also on shoulder, edge L, Fig. 2, and side, edge N, Fig. 2.

To lay off side piece, place back section on cloth. Dot through numbers equal to number of inches in first measurement (in this case 23) in rows $g'$ and $h'$; also, through bust number to correspond with inches in bust measurement (in this case 42) in row $i'$; also, dot through numbers corresponding to number of inches in waist measure (in this case 26) in rows $k'$ and $l'$. Connect the dot 23, row $g'$, with dot 42, row $i'$, by a straight line. Draw a line through dot 23, row $h'$, and dot 26, row $l'$, using curved edge F' of side-form section as a guide, said line being outwardly curved and of the same length as the inwardly-curved line drawn on the back-pattern from dot 23, row $g'$, to the intersection of right-angle line and the line dropped from dot 26, row $l'$. Continue this curved line, according to desire. Place the corner formed by the shoulder edge M and side edge N of back section on the dot 42, row $i'$. Draw a line, using the inwardly-curved edge N as a guide, through dot 26, row $k'$, and ending at a point on the scale P of back section equal to the number of inches in the second underarm measurement, (in this case eleven and one-half.) Continue this line four inches (in all cases the same) below the said point, and then at right angle draw a line extending outwardly one and one-half inches, (in all cases the same.) Connect the end of this last line with the aforesaid point. Allow for seams on each side only. The bottom line is located as desired.

To draw upper half of sleeve, lay sleeve-section, Fig. 4, on the cloth and, using edge K' as a guide, draw the inner curve. Then, using a number equal to first measurement (in this case 23) in the inside row $p'$ on sleeve-section dot through the perforation contiguous thereto. With same number on inner row of perforations at the bottom ($o'$, Fig. 4) dot through. Then, using the edge L' of the sleeve-section as a guide, draw a curved line through these two dots. Next, using the top edge H' of sleeve-section as a guide, draw an outwardly-curved line, connecting the upper dot with the upper end of the inner edge of sleeve, which was the first line drawn. From the lower dot draw a straight line approximately radial to the outer curve of sleeve, being drawn simply by the eye.

To lay off the lower sleeve, draw the inner edge as before. Dot through the perforations at the upper end, as designated by a number in upper or outer row $q'$, indicating the number of inches in the first measurement, (in this case twenty-three;) also, dot through the similarly-numbered perforation in the lowest row $n'$. Connect the points as before; but instead of using the upper edge H' to draw an outwardly-curved line invert it, so that the resulting line will curve inwardly.

It will be seen from the foregoing example that by the use of my chart nearly all the outline of the garment is located from the first measurement. From the first measurement is obtained the neck, shoulder, front, arm-size, length and width of sleeves, and position of two side darts and one under-arm dart.

Having thus fully described my invention, what I claim as new, and what I desire to secure by Letters Patent, is—

A garment-chart having first-measurement numbers and perforations contiguous thereto arranged in series, said first-measurement numbers indicating the number of inches in a measurement taken from the neck-joint, around over the shoulder, and up under the arm to the place of beginning.

In testimony whereof I affix my signature in presence of two witnesses.

JENNIE BLIZZARD.

Witnesses:
G. W. SCHEID,
LOU CABLE.